United States Patent [19]

Kubotera et al.

[11] Patent Number: 4,903,437
[45] Date of Patent: Feb. 27, 1990

[54] SLICING MACHINE FOR CUTTING SEMICONDUCTOR MATERIAL

[75] Inventors: Yutaka Kubotera, Yokohama; Kazunari Akiyama, Kawasaki, both of Japan

[73] Assignee: Mitsubishi Kinzoku Kabushiki Kaisha, Tokyo, Japan

[21] Appl. No.: 223,798

[22] Filed: Jul. 25, 1988

[30] Foreign Application Priority Data

Jul. 31, 1987 [JP] Japan .................................. 62-192475
Jul. 31, 1987 [JP] Japan .................................. 62-192476

[51] Int. Cl.⁴ .............................................. B25B 49/00
[52] U.S. Cl. .............................. 51/165.71; 51/165.77; 175/12; 364/474.06
[58] Field of Search ............. 51/165.71, 165.72, 165.8, 51/165.81; 125/12; 364/474.06

[56] References Cited

U.S. PATENT DOCUMENTS

| | | | |
|---|---|---|---|
| 4,294,045 | 10/1981 | Enomoto et al. | 51/165.77 |
| 4,324,073 | 4/1982 | Belthle | 51/165.77 |
| 4,368,596 | 1/1983 | Wada et al. | 51/165.77 |

Primary Examiner—Frederick R. Schmidt
Assistant Examiner—Maurina Rachuba
Attorney, Agent, or Firm—Scully, Scott, Murphy & Presser

[57] ABSTRACT

Slicing machine having a handle to be driven manually to generate command pulses. By revolving the handle, a feedtable is moved at the operator's command, enabling the positioning of a semiconductor material at the right position to start slicing. The thickness of the first wafer cut off from the material as well as other wafers, has a predetermined thickness, so that no wafer is wasted.

8 Claims, 3 Drawing Sheets

SLICING MACHINE FOR CUTTING SEMICONDUCTOR MATERIAL

BACKGROUND OF THE INVENTION

1. Field of the Invention

The present invention relates to a slicing machine which successively slices a single-crystal semiconductor material into wafers of a predetermined thickness.

2. Description of the Prior Art

Slicing machines used to cut semiconductor material into wafer generally comprise a blade to cut a single-crystal semiconductor material in the form of a bar and a feedtable to carry it. The feedtable moves forward to set the semiconductor material in a right position for cutting and moves upward against the blade during cutting. The blade is usually an inner diameter disk cutter which cuts the bar by a tip formed along the inner-edge of the ring type disk.

These slicing machines have the following disadvantages.

(1) Before starting a slicing operation, an operator has to set a semiconductor bar mounted on the feedtable in the cutting position. To achieve this positioning, the operator has to inch the feedtable by turning on and off the motor which drives the feedtable. The operator, observing the bar and the blade, stops the bar when its front face passes the blade slightly. Once the initial position for cutting has been determined, the slicing operation starts from this position. As this initial position is determined by observation and the feedtable cannot be positioned at the operator's command, the first slice cut off from the bar has an undetermined thickness. So the first slice has to be wasted as a scrap.

(2) When the electric power is turned off, the data about the position of the feedtable at that instance is lost from the memory provided in the machine. For this reason, the relocation of the bar is required when the power is turned on again to continue the slicing operation. And this relocation is a very tedious work.

BRIEF SUMMARY OF THE INVENTION

It is therefore an object of this invention to provide a novel slicing machine which produces no waste wafer, or which can slice a semiconductor bar such that even the first wafer has a predetermined thickness.

It is a further object of the invention to provide a machine which is able to store and keep the data about the position of the feedtable at the power-off moment, so that on switching back again, the slicing operation can be continued without manual relocation of the feedtable.

According to the present invention, there is provided a slicing machine for cutting semiconductor material into wafers, having a feedtable which carries a semiconductor material to be cut, a carrying mechanism which moves the feedtable, a driving circuit which drives the carrying mechanism according to command pulses, a main controller which feeds the command pulses to the driving circuit, and a detection means which detects the position of the feedtable and outputs position data, wherein said slicing machine comprises:

(a) a handle operatively connected to the feedtable so as to move the feedtable manually;

(b) a manual pulse generator which produces a series of pulses according to the rotation of the handle; and (c) a manual pulse controller which transforms the said series of pulses into the command pulses, and supplies the command pulses to the driving circuit.

BRIEF DESCRIPTION OF THE DRAWINGS

With reference to the accompanying drawings.

DETAILED DESCRIPTION OF THE INVENTION

Figure 1:
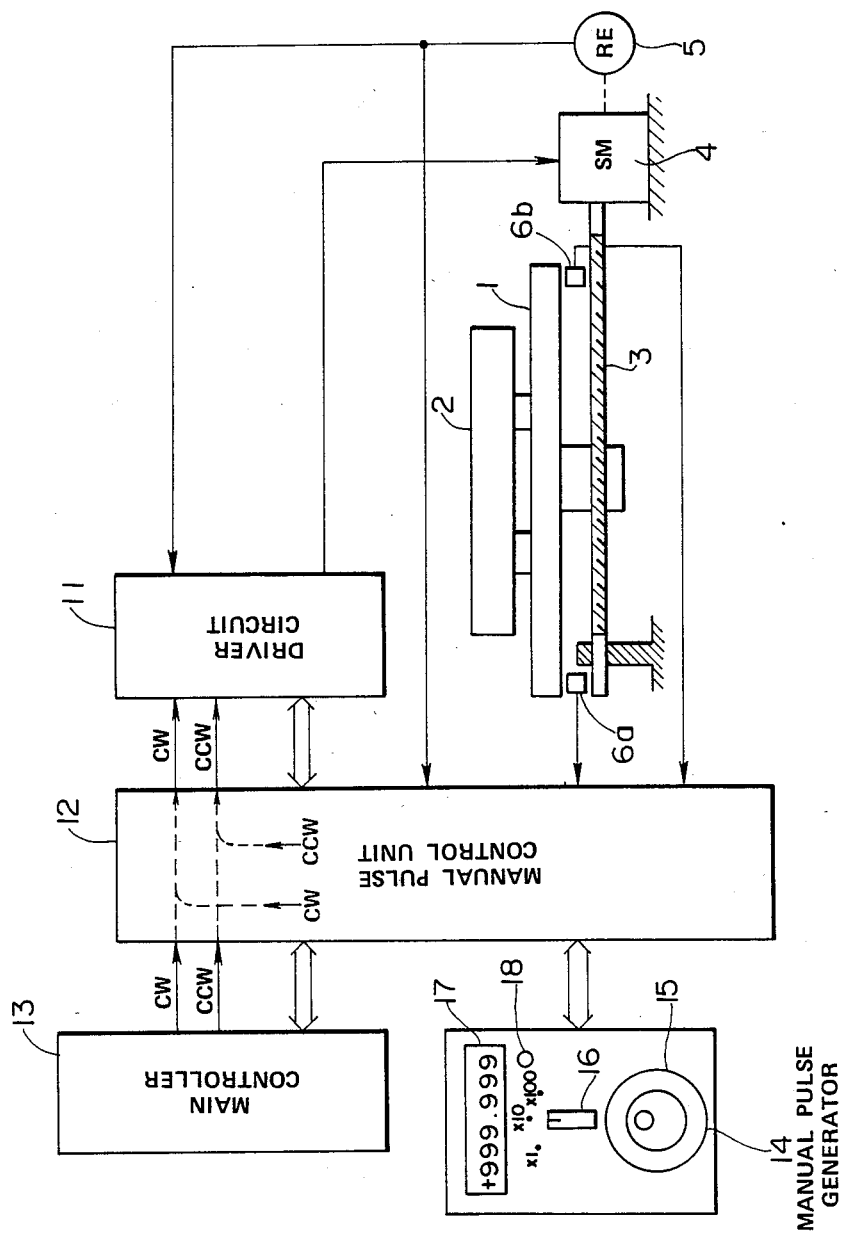
FIG. 1 is a block diagram illustrating a slicing machine for cutting a semiconductor material according to an embodiment of the invention.

The slicing machine according to this invention has a feedtable 1 on which a single-crystal semiconductor bar 2 to be cut is mounted. The feed table 1 is provided with a leadscrew 3 which is revolved by a d.c. servo-motor 4. The servo-motor 4 rotates in either direction, clockwise(CW) or counterclockwise(CCW). When the servo-motor 4 rotates clockwise, the feedtable 1 moves forward (to the left of FIG. 1), and vice versa. The shaft of the servo-motor 4 is connected to a rotary-encoder 5 that alternatively delivers two series of pulses (up-count or down-count pulses) according to the rotary direction of the servo-motor 4. More specifically, the rotary-encoder 5 has two outgoing lines, one for delivering up-count pulses proportional to the CW rotation of the servo-motor 4 or to the forward movement of the feedtable 1, and the other for delivering down-count pulses proportional to the CCW rotation of the servo-motor 4 or to the backward movement of the feedtable 1.

To detect the limits of movement of the feedtable 1, limit-switches 6a and 6b are provided below each edge of the feedtable 1. When the limit switch 6a or 6b is turned on, the movement of feedtable 1 is stopped to prevent the machine from breakage.

The servo-motor 4 and the rotary-encoder 5 are connected to a driver circuit 11, and the servo-motor 4 is actuated by a driving current supplied from the driver circuit 11. The rotary-encoder 5 in turn detects the revolution of the servo-motor 4, and outputs up-down count pulses. The driver circuit 11, having an up-down counter and a digital comparator (not shown), counts up or down these pulses and compares the count with the number of command pulses fed from a manual pulse control unit 12, and controls the feedtable 1 to move by the amount commanded by the command pulses. The command pulses are composed of two series of pulses CW and CCW generated in a conventional main controller 13 or in the manual pulse control unit 12: in the auto-feed mode, the command pulses CW or CCW are fed from the main controller 13 to the driver circuit 11 via the manual pulse control unit 12, to drive the servo-motor 4 and move the feedtable 1 automatically; in the manual-feed mode, the command pulses CW or CCW are fed directly from the manual pulse control unit 12 to the driver circuit 11, and the feedtable 1 comes to be moved manually.

In the manual-feed mode, by revolving a handle 15, a series of pulses (manual pulses) is produced in a manual pulse generator 14, and is applied to the manual pulse control unit 12, where the manual pulses are transformed to the command pulses as will be described later. In this case, for instance, the feedtable 1 moves 1

μm for every one pulse of the command pulses. The feed rate of the feedtable 1 depends on the frequency of the command pulses which can be altered by selecting the ratio (×1, ×10, ×100) with a rotary-switch 16. A digital display 17 on the front panel of the manual pulse generator 14 shows the current position of the feedtable 1, according to the signal supplied from the rotary-encoder 5 via the manual pulse control unit 12. The display data may be cleared by a reset switch 18, and the position of the feedtable 1 at this moment becomes the initial position.

Figure 2:
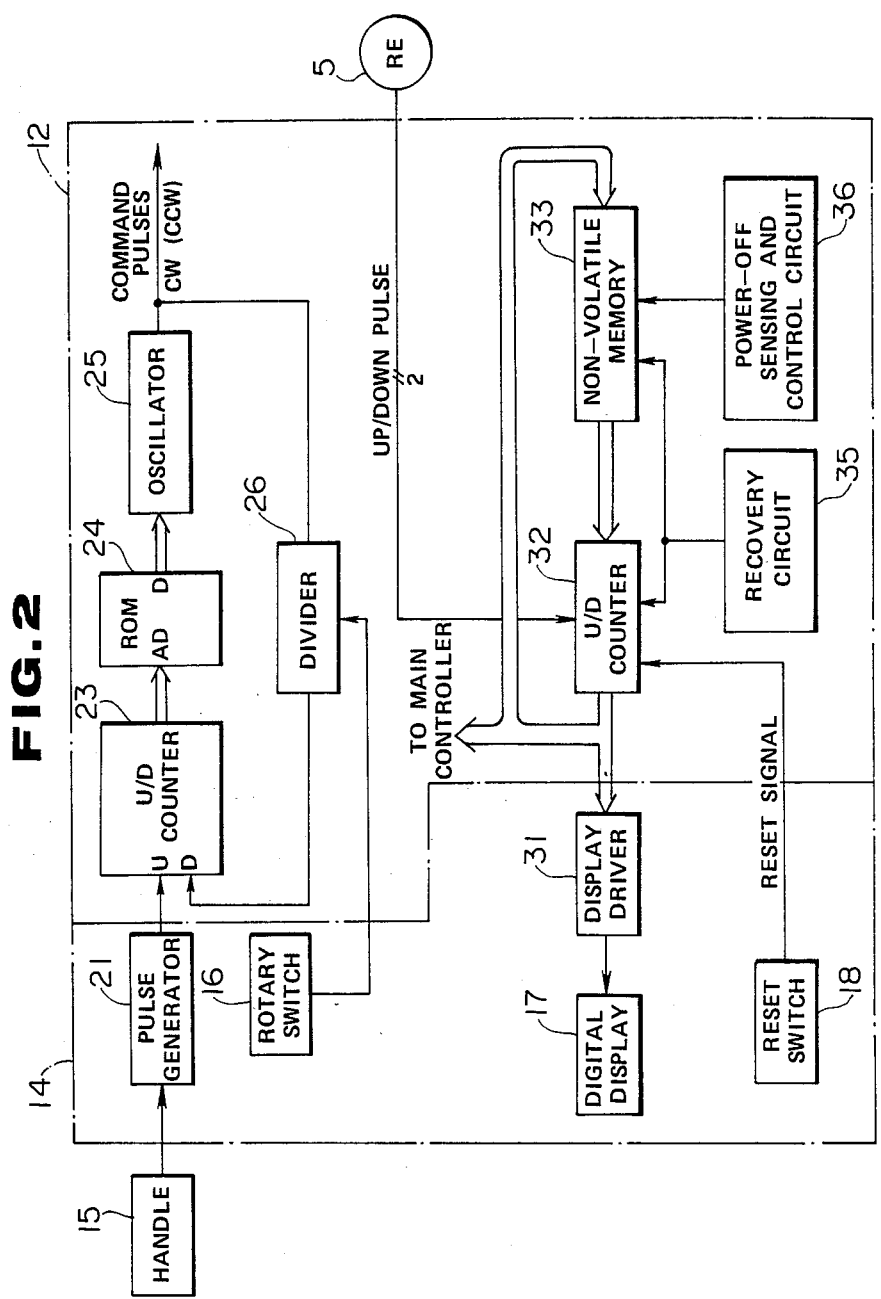
FIG. 2 is a block diagram illustrating the manual pulse generator 14 and the manual pulse control unit 12 of the embodiment.

FIG. 2 is a block diagram illustrating the manual pulse generator 14 and the manual pulse control unit 12 mentioned above. A pulse generator 21, which may be a shaft encoder, produces a series of pulses (manual pulses) whose frequency is proportional to the rate of revolution of the handle 15. The output pulses of the pulse generator 21 is applied to the count up terminal of an up-down counter 23, to increase the count of the counter 23. The content of the counter 23 is supplied to the address input of the ROM (read-only memory) 24 which stores a predetermined pattern. The ROM 24 outputs data which is determined by the stored pattern and supplies the data to an oscillator 25. The oscillator 25, having for example, a digital-to-analog converter and a voltage controlled oscillator not shown, transforms the output data from the ROM 24 to command pulses corresponding to the count data of the up-down counter 23. This count data is the difference between the number of pulses fed from the pulse generator 21 and the number of pulses fed from a divider 26, which divides the frequency of the command pulses CW or CCW, according to the ratio selected by the rotary-switch 16.

Figure 3:
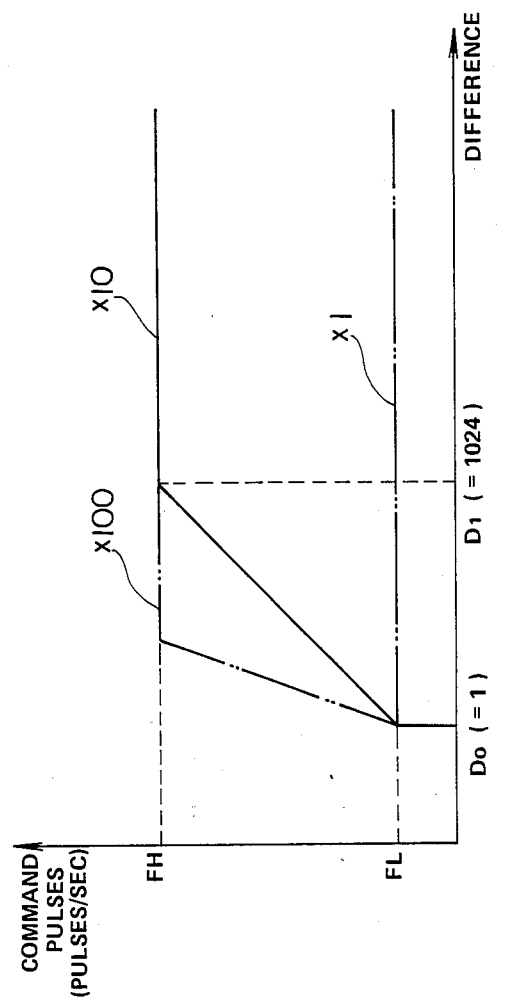
FIG. 3 is a graphical representation illustrating the pattern stored in the read-only memory.

FIG. 3 illustrates an example of the stored pattern mentioned above. When the difference (that is, the output of the up-down counter 23) reaches a constant value D0, e.g. 1, the pattern takes the minimum value, and the oscillator 25 begins to produce command pulses at a minimum frequency FL. As the difference becomes bigger the frequency increases linearly, until the difference becomes a constant value D1, where the frequency of the oscillator 25 reaches the maximum frequency FH. Beyond that difference, the frequency is kept constant even if the difference increases.

The output of the oscillator 25 is supplied to the driver circuit 11 (FIG. 1) as the command pulses. At the same time, it is supplied to the count down terminal of the up-down counter 23 via the divider 26, and the difference between the two series of pulses fed from the pulse generator 21 and the divider 26 is counted. The dividing ratio of the divider 26 can be altered by selecting the ratio with the rotary-switch 16. As the ratio takes a value of 1, 10, or 100, the dividing ratio of the divider 26 becomes 1, 1/10, or 1/100 respectively. Thus, the command pulses, whose frequency equals the number of the manual pulses multiplied by the value selected by the rotary-switch 16, is fed to the driver circuit 11. In FIG. 3, the solid line shows the pattern corresponding to the ratio 10, and the two-dots-dash-line shows the pattern corresponding to the ratio 1 or 100.

Referring to FIG. 2 again, the display 17 is connected to a display driver 31. The display driver 31 responds to the count data of an up-down counter 32 and transfers data which is proportional to the count data to the display 17. As the counter 32 counts up or down the pulses fed from the rotary-encoder 5, the count data is proportional to the position of the feedtable 1, and so the digits displayed on the display 17 indicates the feed position.

The up-down counter 32 is cleared by the reset signal from the reset switch 18, and the location of the feedtable 1 at this moment becomes the initial position. The count data corresponding to the feed position is written into a non-volatile memory 33 such as EEPROM (electrically erasable programmable read-only memory) at the moment when the power is removed, and is kept in the memory 33 during the power-off as the position data to be used for the recovery when the power is turned on again. In this case, a power-off sensing and control circuit 36 detects the power-off, and writes the content of the up-down counter 32 into the non-volatile memory 33. When the power turns on again, the recovery circuit 35, detecting the power-on condition, retrieves the data in the non-volatile memory 33 to preset it into the up-down counter 32 whose output is transferred to the main controller 13.

The overall operation is as follows.

To start the slicing operation of a single-crystal semiconductor bar 2, the initial positioning of the feedtable 1 is achieved by the following process.

(1) The semiconductor bar 2 is mounted on the feedtable 1.

(2) A selector switch (not shown) is set in manual-feed mode, and the handle 15 of the manual pulse generator 14 is revolved.

(3) By the above operation, the pulse generator 21 begins to produce manual pulses, and the up-down counter 23 begins to count up them. When the value of the counter 23, which is the difference between the manual pulses and the output pulses of the divider 26, reaches D0 (see FIG. 3), the ROM 24 begins to output the data determined by the stored pattern shown in FIG. 3. The oscillator 25, receiving the data, begins to produce the command pulses whose frequency corresponds to the difference. The command pulses are fed to the driver circuit 11 which provides the driving current to the servo-motor 4. Thus, the servo-motor 4 begins to revolve the leadscrew 3 to move the feedtable 1.

(4) The operator, selecting the appropriate ratio with the rotary-switch 16 and revolving the handle 15, can control the movement of the feedtable 1 as he desires. And when the front face of the semiconductor bar 2 comes in agreement with the blade of the inner diameter disk cutter, he stops the feed operation, and the initial positioning is completed. This alignment between the front face and the blade is perceived by fricative noise produced by the slight friction between the two. At the moment when the fricative noise begins, the operator at once stops the revolving of the handle 15 and makes this position as the initial position.

(5) After completing the initial positioning of the feedtable 1, the operator clears the up-down counter 32 and so the digital display 17 into zero, to set the position as the zero point.

After that, the operator changes the mode from manual-feed mode to auto-feed mode to initiate the cutting operation. In the auto-feed mode, the semiconductor bar 2 is automatically fed forwards by a predetermined amount and then upwards to be cut into a wafer under the control of the main controller 13. Repeating these operations, wafers of a predetermined thickness are consecutively produced.

Suppose that the cutting operation of the bar 2 has to be suspended in order to exchange the blade (inner diameter disk cutter).

In such a case, the operator reset the up-down counter 32 by depressing the reset switch 18 at the suspended position of the feedtable 1, and turned off the power after returning the feedtable 1 to its original position. Then, having exchanged the blade to new one, he turned on the power again. When the power is turned on, the position data of feedtable 1 at the power-off moment, which was stored and has been fixed in the non-volatile memory 33, is automatically retrieved from the memory 33 by the recovery circuit 35 and is written into the up-down counter 32. Then, according to the content of the counter 32, the feedtable 1 is moved under the control of the main controller 13 until the content of the counter 32 becomes zero and stationed at the position occupied at the suspension, and so no relocation by the operator is required.

While the slicing machine according to the present invention has been specifically shown and described herein, the invention itself should not be restricted by the exact showing of the drawings or the description thereof. For example, although the oscillator 25 in FIG. 2 is composed of a digital-to-analog converter and a voltage controlled oscillator, it may be composed of a programmable oscillator that produces a train of pulses corresponding to the digital data from the ROM 24. And since the above mentioned stored pattern in ROM 24, shown in FIG. 3, may be altered—e.g. the slope of the velocity, or the maximum frequency can be changeable as desired—the system can be applied to various situations.

What is claimed is:

1. A slicing machine for cutting semiconductor material into wafers, having a feedtable to be adapted to carry thereon a semiconductor material to be cut, a carrying mechanism which moves the feedtable, a driving circuit which drives the carrying mechanism according to command pulses, a main controller which feeds the command pulses to the driving circuit, and a detection means which detects the position of the feedtable and outputs position data, wherein said slicing machine comprises:
   (a) a handle operatively connected to the feedtable so as to move the feedtable manually;
   (b) a manual pulse generator which produces a series of pulses according to the rotation of the handle; and
   (c) a manual pulse controller which transforms the said series of pulses into the command pulses, and supplies the command pulses to the driving circuit.

2. A slicing machine of claim 1, wherein said manual pulse controller comprises:
   (a) an up-down counter for counting the difference between the number of output pulses of the manual pulse generator and the number of the command pulses;
   (b) a ROM for storing a predetermined pattern for correlating the output of the up-down counter with the frequency of the command pulses, and producing data which determines the frequency of the command pulses in response to the output of the up-down counter; and
   (c) a means for oscillating the command pulses according to the output of the ROM.

3. A slicing machine of claim 2, wherein said manual pulse controller further comprises a divider for dividing the frequency of the command pulses and feeds its output to an input terminal of the up-down counter.

4. A slicing machine of claim 3, further comprising a selecting switch connected to the divider for selecting a dividing ratio of the divider.

5. A slicing machine of claim 1, further comprising a non-volatile memory to store the position data of the feedtable, a means to write the position data into the non-volatile memory at the moment when an externally supplied electric power is turned off, and a means to retrieve the position data from the non-volatile memory to the detection means when the electric power is turned on.

6. A slicing machine of claim 5, wherein said detection means comprises a rotary-encoder to detect the position of the feedtable and an up-down counter to count output pulses of the rotary-encoder.

7. A slicing machine of claim 6, further comprising a reset switch for clearing the up-down counter.

8. A slicing machine of claim 7, further comprising a display means to display the position data retrieved from the non-volatile memory.

* * * * *